(12) United States Patent
Nishi (10) Patent No.: US 6,578,283 B2
(45) Date of Patent: Jun. 17, 2003

(54) POSITION TRANSDUCER

(75) Inventor: Eiichi Nishi, Tokyo (JP)

(73) Assignee: Sony Precision Technology Inc., Tokyo (JP)

( * ) Notice: Subject to any disclaimer, the term of this patent is extended or adjusted under 35 U.S.C. 154(b) by 0 days.

(21) Appl. No.: 09/812,490

(22) Filed: Mar. 19, 2001

(65) Prior Publication Data

US 2002/0029488 A1 Mar. 14, 2002

(30) Foreign Application Priority Data

Aug. 15, 2000 (JP) ........................................ 2000-246419

(51) Int. Cl.$^7$ ................................................. G01B 7/00

(52) U.S. Cl. ............................. 33/706; 33/707; 33/708

(58) Field of Search ........................... 33/706, 707, 708

(56) References Cited

U.S. PATENT DOCUMENTS

| | | | | | |
|---|---|---|---|---|---|
| 5,142,792 | A | * | 9/1992 | Nelle | 33/706 |
| 5,687,489 | A | * | 11/1997 | Tondorf et al. | 33/706 |
| 5,842,283 | A | * | 12/1998 | Yatsu et al. | 33/708 |
| 6,049,988 | A | * | 4/2000 | Shirai | 33/1 M |
| 6,145,214 | A | * | 11/2000 | Shimano et al. | 33/706 |
| 6,327,929 | B1 | * | 12/2001 | Yanagisawa | 33/1 M |
| 6,347,458 | B1 | * | 2/2002 | Kaczynski | 33/503 |
| 6,370,786 | B2 | * | 4/2002 | Ishii | 33/501.12 |

* cited by examiner

Primary Examiner—Diego Gutierrez
Assistant Examiner—Yaritza Guadalupe
(74) Attorney, Agent, or Firm—Jay H. Maioli (57) ABSTRACT

A position transducer in which a carriage 32 and slider 33 are coupled to each other by tension coil springs 41A and 41B each having an elasticity in a direction in which the carriage 32 and slider 33 are attracted towards each other, with the carriage 32 and slider 33 being butted to each other with a rolling bearing placed at one end of the carriage 33 in the moving direction and which has a ball 40 held by a plane bearing 37 and conical bearing 39.

4 Claims, 11 Drawing Sheets

POSITION TRANSDUCER

BACKGROUND OF THE INVENTION

1. Field of the Invention

The present invention relates to a position transducer for use as installed to the body of a machine tool, industrial equipment, precision measurement equipment or the like, each provided with a moving or movable part and a stationary part, which move linearly in relation to each other, to measure an amount of travel and moved position of the moving part relative to the stationary part.

2. Description of the Related Art

The position transducer is installed to a moving part and a stationary part of a machine tool, industrial equipment, precision measuring equipment or the like (will be referred to simply as "machine body" hereunder), which move linearly in relation to each other, to measure an amount of travel and moved position of the moving part relative to the stationary part, for example.

The conventional position transducer includes a long graduated scale provided to detect a position during relative movement of the stationary and moving parts, and a sensor unit having disposed therein a detection head which reads a graduation provided on the scale. The scale is fixed to the stationary part while the sensor unit is fixed to the moving part. The sensor unit includes a slider disposed on the scale to read a displacement on the graduation by the detection head, and a carrier coupled to the slider to move along with the moving part of the machine body, the slider being coupled to the carrier by a coupling.

In the position transducer constructed as in the above, as the carrier is moved along with a linear movement of the moving part of the machine body, the slider is towed or pushed by the coupling connecting the slider and carrier, by the coupler, to the carrier and travels on and longitudinally of the scale. The position transducer reads, by the detection head disposed on the slider, a displacement of the slider on the graduation on the scale to measure an amount of travel and moved position of the moving part relative to the stationary part.

In the conventional position transducer, as the moving part of the machine body, installed as in the above, moves linearly, the carrier moves following up a meandering or swelling movement of the moving part of the machine body. Also, in the position transducer, the slider is disposed in contact with the scale and moves following up a surface condition of the scale, more specifically, a meandering or swelling of the scale surface. That is, in the position transducer, a relatively moved position and relative moving distance are measured by the slider and carrier destined for different movements, respectively, and so the positions of the slider and carrier are possibly deviated from each other in the course of a measurement. In the position transducer of this type, the slider and carrier are coupled to each other by applying a force to the slider or carrier independently of a contact point at the coupling connecting the slider and carrier. So, the above positional deviation cause a dynamic vector in a direction other than the moving direction of the slider, in other words, in a direction in which the linear movement of the slider is inhibited, which results in a measurement error due to a return error or degradation of repeatability precision. Generally, when the position transducer is constructed to attain a high performance and high resolution among others, a contact friction due to the dynamic vector developed at the coupling connecting the slider and carrier will inhibit the slider from moving linearly, which will influence the repeatability precision and return error.

To solve the above problem, it has been proposed to provide at the coupling connecting the slider and carrier a universal mechanism whose position is variable to accommodate an out-tolerance installation and out-tolerance part dimensions.

As one of such solutions to the above problem, a position transducer is known from the disclosure in the Japanese Published Unexamined Application No. 4-231810, in which a scanning unit which scans a scale plate is mounted with a coupling fixed in a measuring direction on a mount base of a machine tool, the coupling consisting of a first plate-shaped coupling piece fixed to the scanning unit and a second pin-shaped coupling piece fixed to a carriage and having a spheric end face, and a sliding layer is provided between the coupling pieces. In this position transducer thus constructed, an unmeasurable friction is generated between the coupling pieces to prevent degradation of measuring precision even when a relative movement takes place.

As another of such solutions, a position transducer is known from the disclosure in the Japanese Published Unexamined Application No. 5-87552, in which an intermediate coupling member is slidably coupled to a slider-side coupling member and the intermediate coupling and a carrier-side coupling member are put in line contact with each other in a concavo-convex relation to correct a detecting precision error.

In the position transducer disclosed in the Japanese Published Unexamined Application No. 5-87552, the intermediate coupling member and carrier-side coupling member are put in line contact with each other in the concavo-convex relation to form a universal coupling mechanism. In this universal coupling mechanism, the slider-side coupling member and intermediate coupling member are moved with a friction between them while being in surface contact because of the straightness of the machine vibration and travel and that of the scale. Namely, when the friction between the intermediate coupling member and carrier-side coupling member exceeds a one assured by the concavo-convex relation, the coupling members slide on each other with a change in angular relation between them, but since the frictional force changes if there is a difference in surface roughness between the coupling members, there occurs a difference in frictional force between the coupling members and so no stable coupling performance can be assured by such coupling members.

As mentioned above, in the position transducer disclosed in the Japanese Published Unexamined Application No. 4-231810, when the coupling consisting of the first plate-shaped coupling piece fixed to the scanning unit and the second pin-shaped coupling piece fixed to the carriage and having a spheric end face, has been used for a long time, a vibration-caused concavity will be formed in the first coupling piece to which the second coupling piece abuts and will possibly impair the stable coupling performance which would otherwise be assured.

Further, in a position transducer including a base unit by which a graduated scale is fixed to a base body, and a slider unit provided on the base unit slidably relative to the base unit and having a sensor which detects the graduation recorded on the scale, if not be perpendicular to a moving direction, a slider and carriage will be deviated from each other for the amplitude of a deflection caused by a machine motion and a swelling surface of the scale and the deflection will appear as a cosine error.

OBJECT AND SUMMARY OF THE INVENTION

It is therefore an object of the present invention to overcome the above-mentioned drawbacks of the prior art by providing a position transducer including a long scale having a position detecting graduation provided thereon along the length thereof, a carriage moving along the scale and having a detection head which reads the graduation to provide a position detection signal, and a slider coupled to the carriage and moving the carriage along the length of the scale, in which when the slider and carriage are moved relative to each other, measurement error is reduced by eliminating Abbe error caused by a positional change taking place between coupling pieces.

The above object can be attained by providing a position transducer including a long scale having a position detecting graduation provided thereon along the length thereof, a carriage moving along the scale and having a detection head which reads the graduation to provide a position detection signal, and a slider coupled to the carriage and moving the carriage along the length of the scale; the carriage and slider are coupled to each other by an elastic member having an elasticity in a direction the carriage and slider are attracted towards each other, with the carriage and slider being butted to each other with a ball placed at one end of the carriage in the moving direction and between them.

With the above position transducer according to the present invention, with the carriage moving along the scale and having the detection head which reads the graduation to provide a position detection signal and the slider which moves the carriage along the length of the scale, being butted to each other with a rolling bearing placed at one end of the carriage in the moving direction and between them, the carriage and slider is coupled to each other by the elastic member having the elasticity in the direction in which the carriage and slider are attracted towards each other, whereby when the slider and carriage move relative to each other, it is possible to eliminate Abbe error due to a positional change occurring between the coupling pieces and thus assure a high accuracy measurement with a reduced measurement error.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Referring now to FIGS. 1 to 4, there is illustrated the construction of an embodiment of the position transducer according to the present invention.

The position transducer is generally indicated with a reference 10. As shown, the position transducer 10 includes a base unit 20, and a slider unit 30 provided slidably in relation to the base unit 20.

Figure 1:
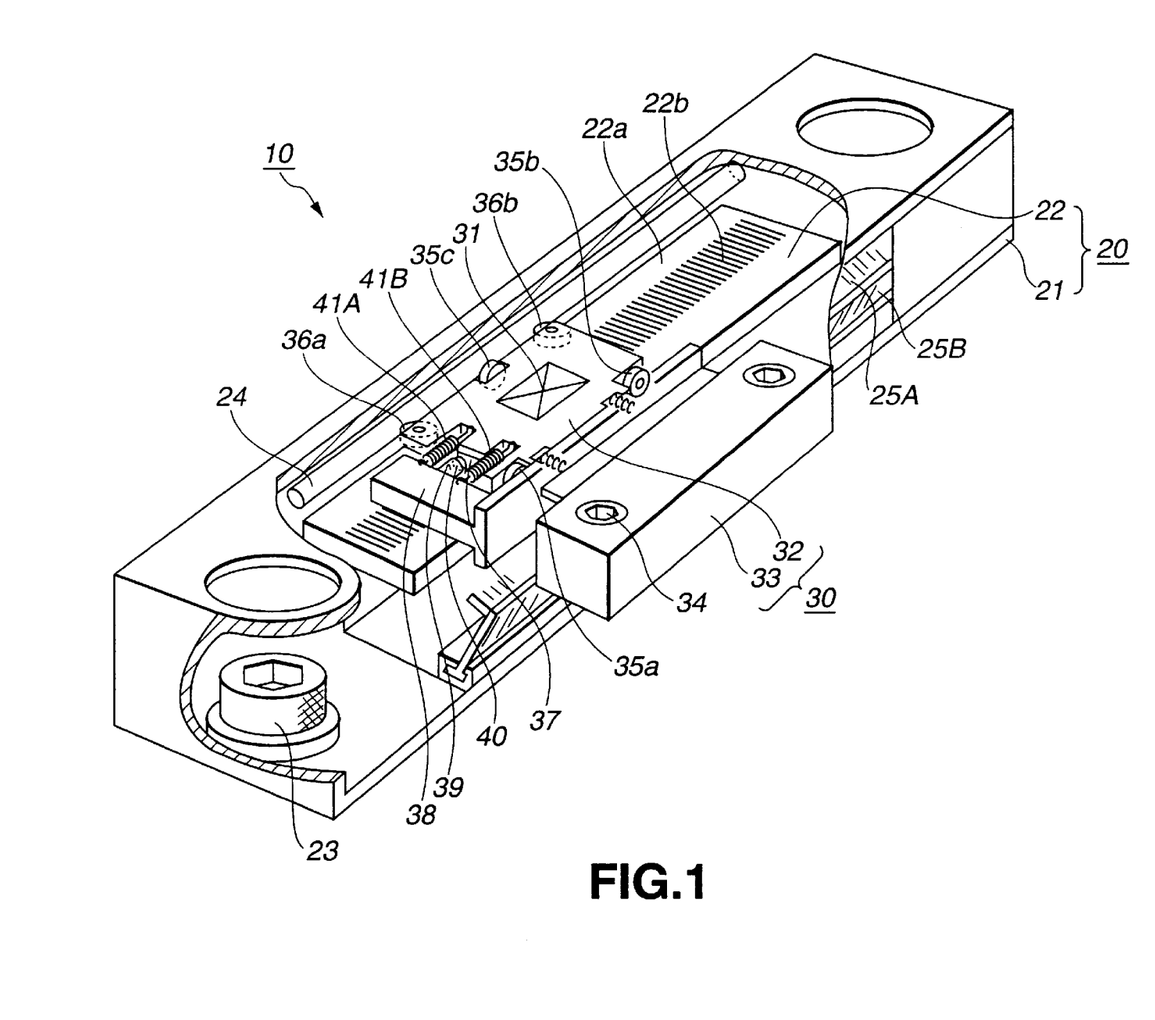
FIG. 1 is a perspective view of the position transducer according to the present invention with the housing being partially cut away.
Figure 2:
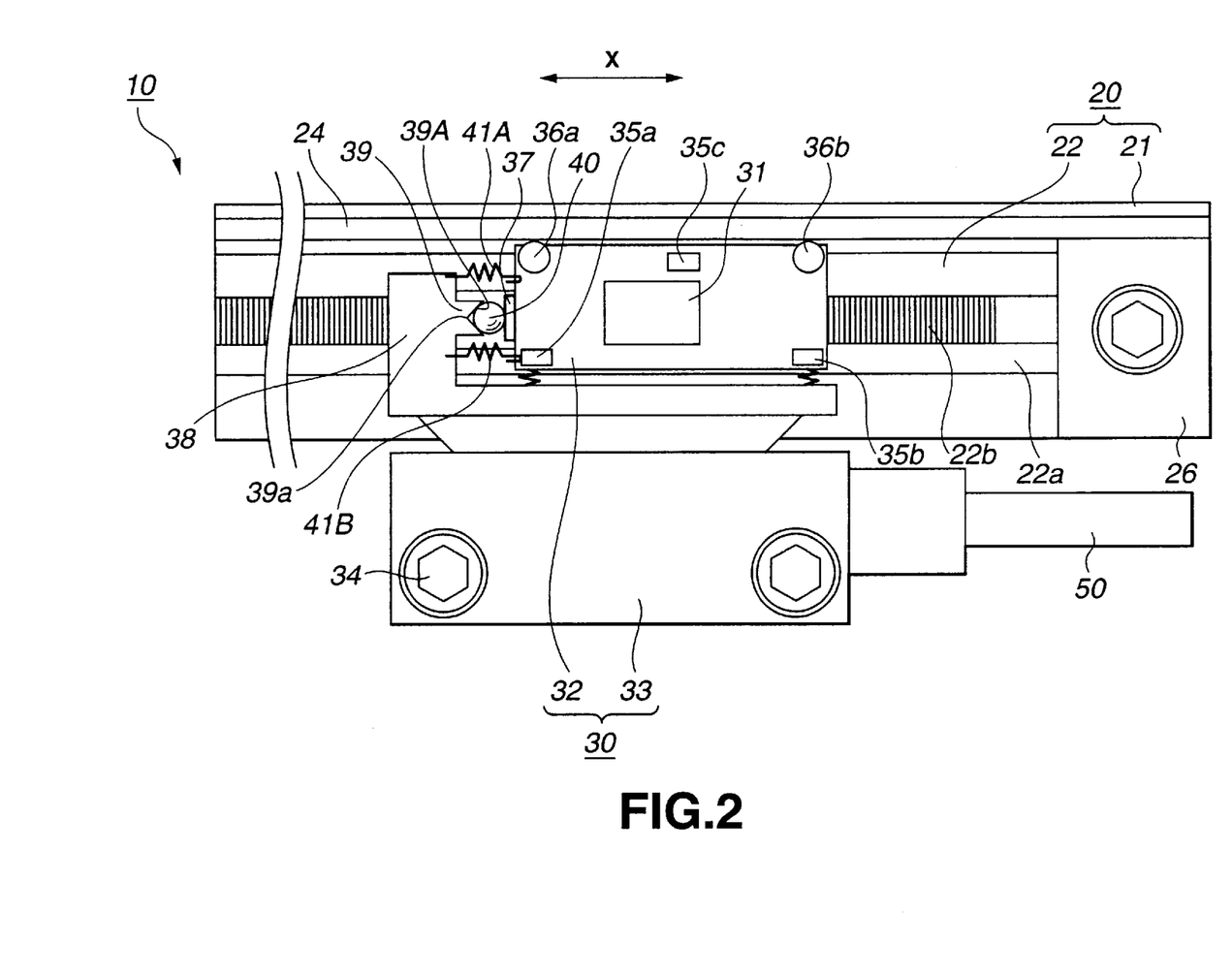
FIG. 2 is a front view of the essential portion of the position transducer in FIG. 1 with the housing being partially cut away.

As best shown in FIGS. 1 and 2, the base unit 20 includes a long housing 21 as a base proper and a long scale 22 provided inside the hosing 21. The base unit 20 is to be fixed with fixing screws 23 in fixing holes formed therein to one of a moving part and stationary part of an object to be measured. On the other hand, the slider unit 30 includes a carriage 32 having provided thereon a detection head 31 to read a graduation on the scale 22, and a slider 33 which supports the carriage 32. The slider unit 30 is to be fixed with fixing screws 34 in fixing holes formed therein to the other of the moving part and stationary part of the object to be measured. When the slider unit 30 is slid relative to the base unit 20 along the length of the scale 22 (direction of arrow X in FIG. 2) as the object under measurement moves linearly, the detection head 31 reads the graduation on the scale 22 to provide an electrical signal via a cable 50, thereby detecting or measuring a moved position of the object under measurement.

That is, the position transducer 10 is intended to measure a moved position and moving distance of the moving part and stationary part formed as part of an industrial machine, machine tool or the like and which move linearly relatively to each other. The base unit 20 is installed to the stationary part of the machine tool, for example, moving relative to the moving part, while the slider 33 coupled to the carriage 32 of the slider unit 30 is installed to the moving part of the machine tool.

Figure 3:
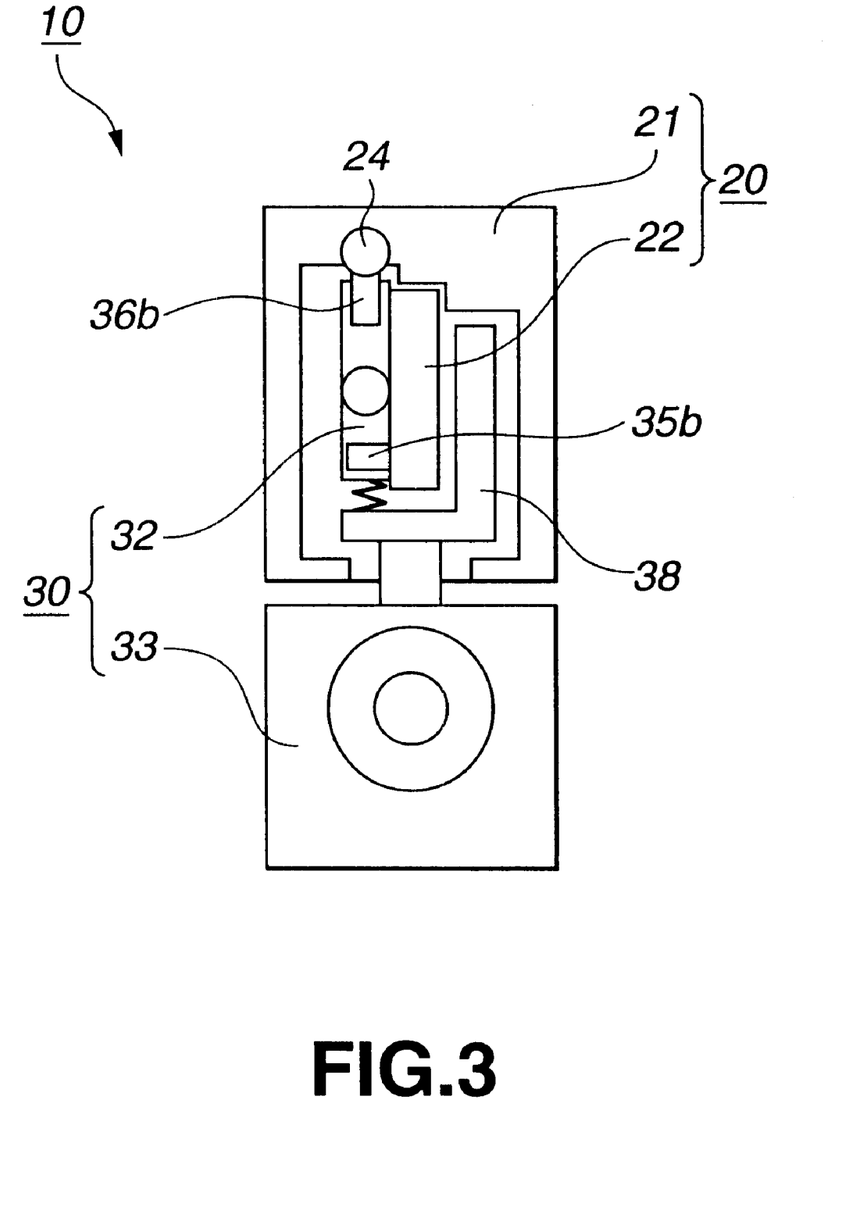
FIG. 3 is an axial sectional side elevation of the position transducer in FIG. 1.

As shown in FIG. 3, the long housing 21 as the base proper of the base unit 20 is a long member having a generally C-shaped section. It has encased therein the plate-like, long scale 22 and a round bar-shaped guide bar 24 so as to be longitudinally aligned therewith. One open side of the housing 21 is openably closed with two dust seals 25A and 25B each formed from a flexible material such as rubber, as shown in FIG. 1. Note that in the position transducer 10, since the housing is formed to have the generally C-shaped section the scale 22 is disposed to have a graduation recording surface thereof directed generally perpendicularly to the open side of the housing 21, foreign matter having entered the housing 21, if any, will not be able to stay on the scale surface having the graduation of the scale 22 recorded thereon, the position transducer 1 can always be kept for accurate detection of a position. Also, since the scale 22 incurs only a reduced deflection due to its own weight, it is possible to detect a position more stably with a high accuracy.

It should be noted that the housing 21 may be a one formed by bending a metal plate having a predetermined rigidity or a one formed by injection molding of aluminum. Of course, the housing 21 may be formed by machining.

The scale 22 is fixed at a predetermined position inside the housing 21 with both ends thereof being supported by a pair of brackets 26 disposed at longitudinal opposite ends of the housing 21. The scale 22 has a position detecting graduation 22b provided on one of main sides (will be referred to as "scale surface" hereunder) 22a thereof. The graduation 22b is a position signal recorded in succession at predetermined intervals along the length of the scale 22. It may be for example a series of pits or marks formed at predetermined intervals, a grating formed on the scale surface 22a, a series of polarized magnetic signals which will not look as a visible graduation but whose polarities are alternately opposite to each other, or the like. The scale 22 is formed from a material different from one to another depending upon the type of the detection head 31 which reads the graduation 22b to detect a position signal, for example, a vitreous material such as glass for an optical head used as the detection head or a metallic material for a magnetic head used as the detection head. In this embodiment, a glass-made scale is used as the scale 22.

Also, the carriage 32 forming the slider unit 30 includes bearings 35a, 35b and 35c rolling on the scale surface 22a of the scale 22 provided inside the housing 21, and bearings 36a and 36b rolling along the guide bar 24, and thus the carriage 32 can freely be slid longitudinally on the scale surface 22a of the scale 22. The carriage 32 has provided in the central portion thereof at one end in the moving direction a plane bearing 37 having a bearing plane perpendicular to the moving direction.

Further, the slider 33 forming the slider unit 30 has a coupling arm 38 provided in the center of the upper surface thereof. The coupling arm 38 is inserted in the housing 21 from one open side of the latter. The coupling arm 38 of the slider 33 has a conical bearing 39 provided in a position opposite to the plane bearing 37 provided at the carriage 32. The conical bearing 39 has a bearing conical surface 39A having a vertex 39a in the moving direction of the carriage 32.

With a ball 40 disposed between the plane bearing 37 provided at the carriage 32 and the conical bearing 39 provided at the coupling arm 38, the carriage 32 and coupling arm 38 are coupled to each other by two tension coil springs 41A and 41B. The two tension coil springs 41A and 41B are disposed symmetrically with respect to a straight line passing through the vertex 39a of the conical bearing surface 39A of the conical bearing 39 to provide an elasticity with which the ball 40 is kept retained between the plane bearing 37 and conical bearing 39.

Figure 4:
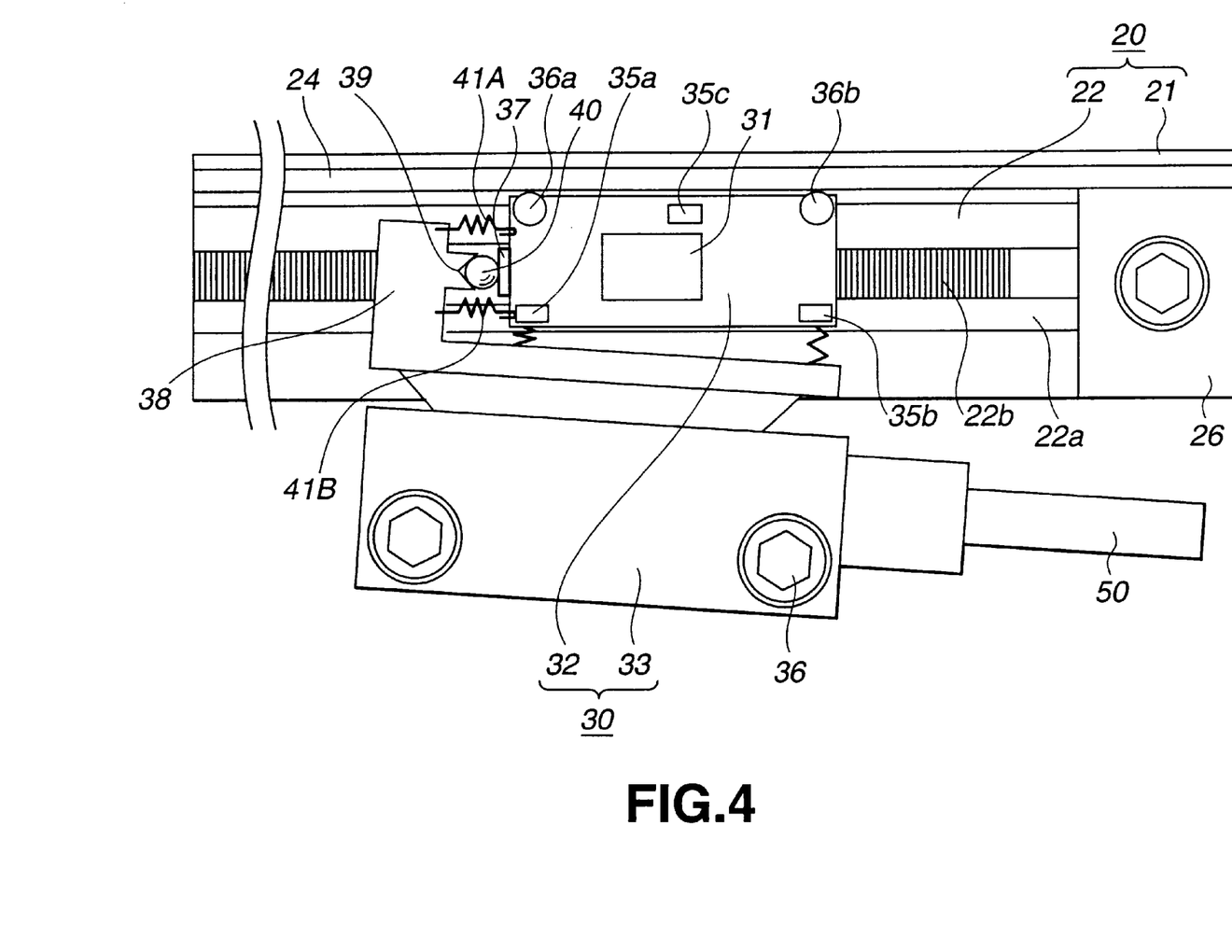
FIG. 4 is a front view of the essential portion of the position transducer in FIG. 1, showing the relative movement of the slider and carriage.

In this position transducer 10, the carriage 32 and slider 33 forming the slider unit 30 are coupled to each other by coupling the carriage 32 and coupling arm 38 to each other by means of the two tension coil springs 41A and 41B with the ball 40 placed between the plane bearing 37 and conical bearing 39 provided on the coupling arm 38. Thus, a universal coupling mechanism is realized in which the ball 40 supported by the conical bearing 39 slides in a nearly point contact with the plan bearing 37 fixed to the carriage 32 and the ball 40 sliding on the bearing conical surface of the conical bearing 39 rotates, as shown in FIG. 4. So the stable, good surface roughness of the ball 40 contributes to provide a universal coupling mechanism assuring an extremely smooth sliding as compared with the conventional plane-on-plane sliding.

Figure 5A:
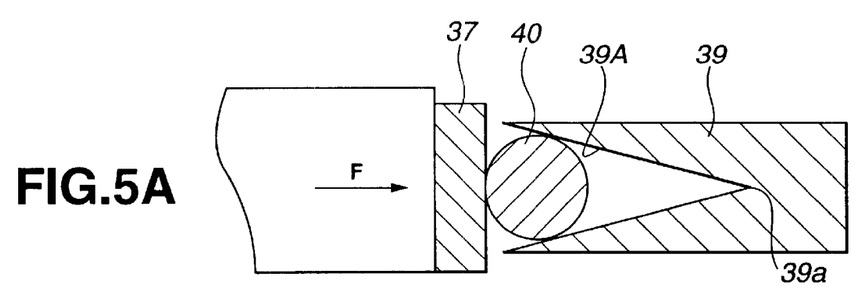
FIG. 5 schematically illustrate a ball and conical bearing forming together a coupling for the slider and carriage of the position transducer in FIG. 1, showing the angle of the bearing conical surface of the conical bearing.
Figure 5B:
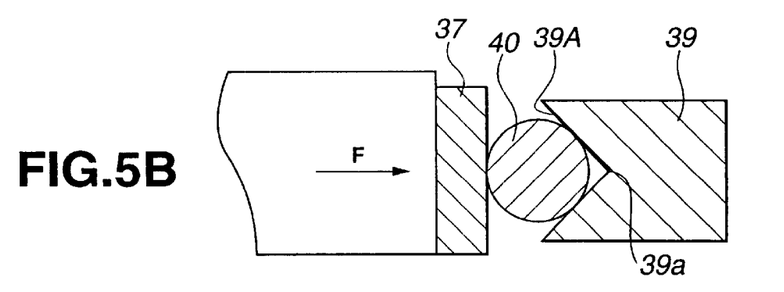
Figure 5C:
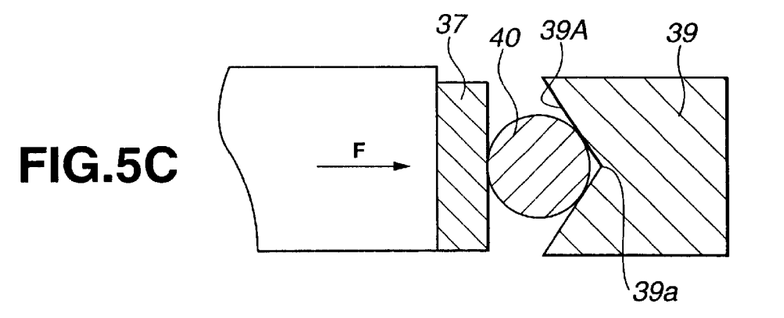
Figure 5D:
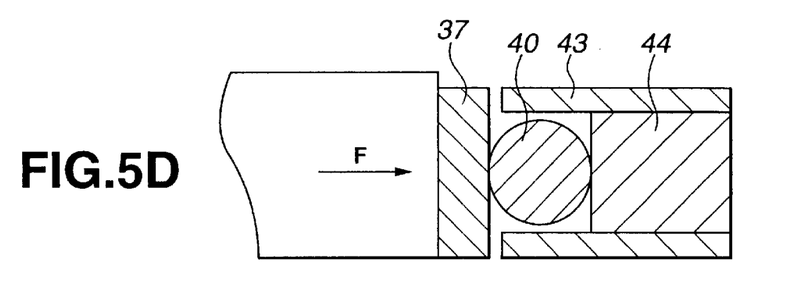
Figure 6:
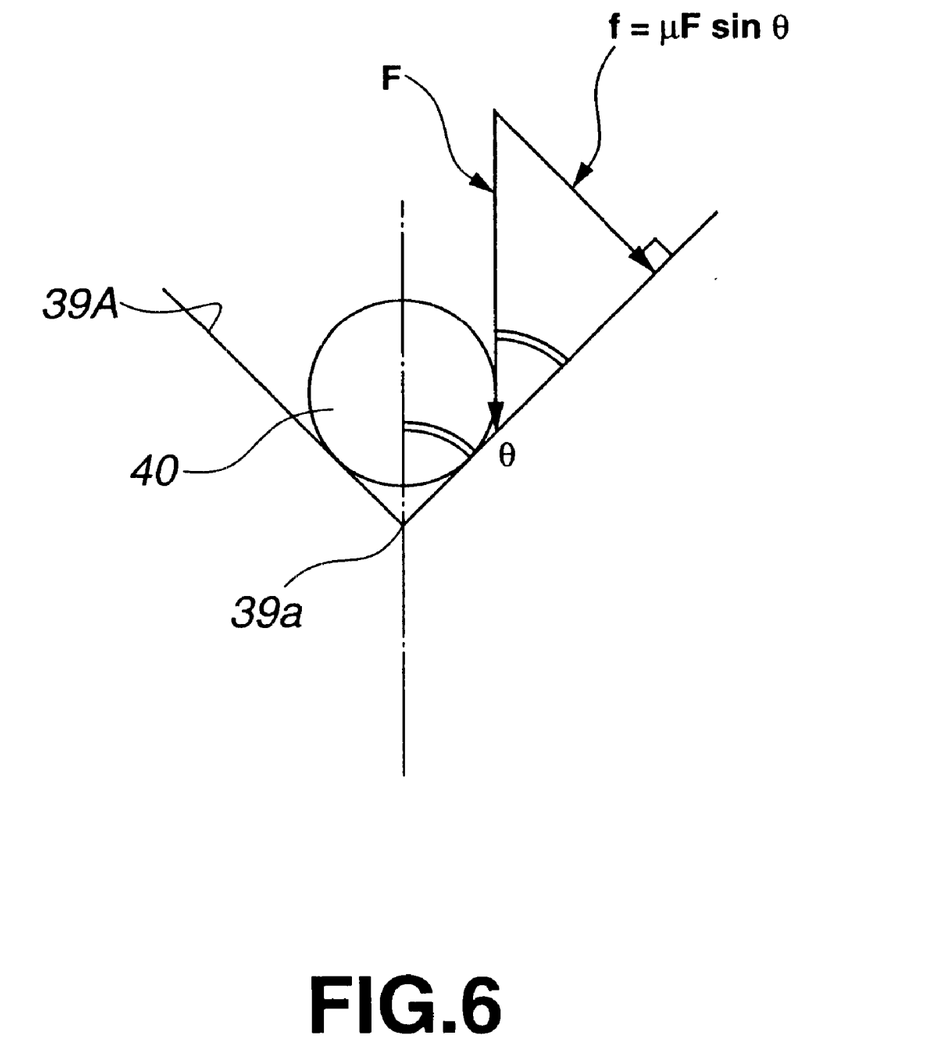
FIG. 6 schematically illustrates the frictional force between the ball and conical bearing.

As shown in FIGS. 5A to 5D, there are schematically illustrated the relation between the ball 40 and conical bearing 39 forming together the coupling for the slider 33 and carriage 32 of the position transducer 10 in FIG. 1 and the angle of the bearing conical surface 39A of the conical bearing 39, and FIG. 6 shows the frictional force between the ball 40 and conical bearing 39. It is assumed that when the bearing conical surface 39A is parallel to the moving direction of the scale 22, the angle θ is 0 deg. as shown in FIG. 6. FIGS. 5A to 5D show the relations between the ball 40 and conical bearing 39 when the angle θ is 15 deg. (the vertical angle of the bearing conical surface 39A is 30 deg.), the angle θ is 22.5 deg. (the vertical angle of the bearing conical surface 39A is 45 deg.), the angle θ is 45 deg. (the vertical angle of the bearing conical surface 39A is 90 deg.) and the angle θ is 60 deg. (the vertical angle of the bearing conical surface 39A is 120 deg.) and the angle θ is 90 deg. (the vertical angle of the bearing conical surface 39A is 180 deg.), respectively.

When it is assumed that a force of the tension coil springs 41A and 41B, with which the carriage 32 and slider 33 are coupled to each other is F (F=4.17N in this example) and the friction coefficient is $\mu$, the force of the friction between the ball 40 and plane bearing 37 is given as $\mu$F while the force f of the friction between the ball 40 and conical bearing 39 is given as $\mu$F·sin θ, as shown in FIG. 6. The measured value of the friction coefficient was about 0.3 to 0.4.

The force of a friction between the ball 40 and plane bearing 37 should be as low as possible. So, the vertex 39a of the bearing conical surface 39A should be smaller. However, since consideration should be taken to the retention of the ball 40 and the distance between the scale surface 22a and center of the ball 40 will have a direct influence as an Abbe error, the diameter of the ball 40 has to be as small as possible. In this embodiment, the ball 40 has a diameter of 3 mm by way of example. To retain the ball 40 having this diameter, the angle θ is set 60 deg. When θ=60 deg., the force f of the friction between the ball 40 and conical bearing 39 is $\mu$F·sin=0.87 $\mu$F. By substituting 0.4 for $\mu$ and 4.17N for F in this equation, the friction force f is 1.45N. Therefore, the vector components have to be designed for such a stress that even if the force with which the carriage 32 fastens the scale 22 exceeds 1.45N when the scale surface 22a meanders or swells or is mechanically vibrated.

When θ=0 deg., $\mu$F=0, which means a friction of a rolling bearing (plane-on-plane sliding). When θ=15 deg. as shown in FIG. 5A, $\mu$F=0.26. When θ=22.5 deg. as shown in FIG. 5B, $\mu$F=0.38. When θ=30 deg. as shown in FIG. 5C, $\mu$F=0.5. When θ=60 deg., $\mu$F=0.87. When θ=90 deg. as shown in FIG. 5D, $\mu$F=1.

In this embodiment, the ball 40 has a surface roughness of 0.05 $\mu$m or less and a hardness of Hrc 65 or less while the bearing conical surface 39A of the conical bearing 39 has a surface roughness of 0.4 $\mu$m or less and a hardness of Hrc 60 to 64. The plane bearing 37 has a flatness of 4 $\mu$m, surface roughness of 0.1 $\mu$m or less, and a hardness of Hrc 65 or more. The ball 40 is a ceramic ball or a steel ball. Also the conical bearing 39 and plane bearing 37 are made of ceramic or cemented material.

By forming the ball 40 and conical bearing 39 to have a surface roughness somewhat different from one to the other against fitting to each other, their surfaces can be well slidable on each other with no adhesion to each other even when a slow vibration takes place.

Figure 7A:
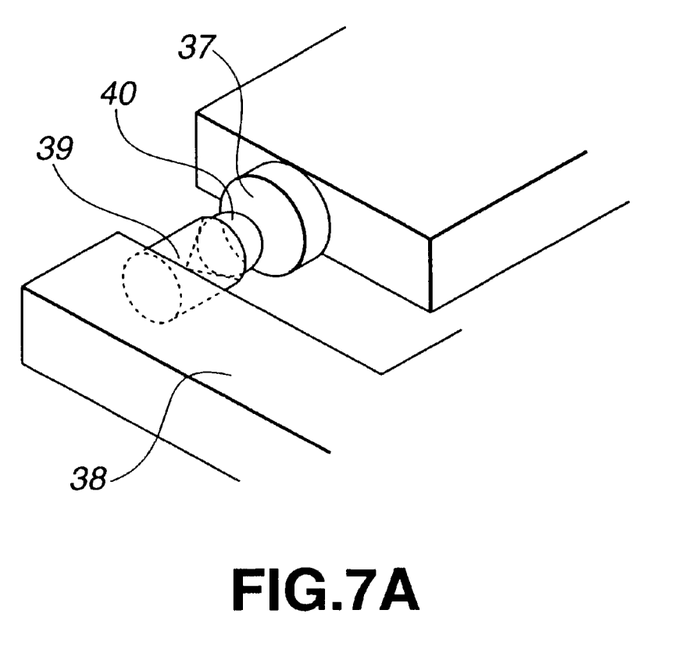
FIG. 7 schematically illustrates examples of the shape of a plane bearing forming the coupling for the slider and carriage in the position transducer in FIG. 1.
Figure 7B:
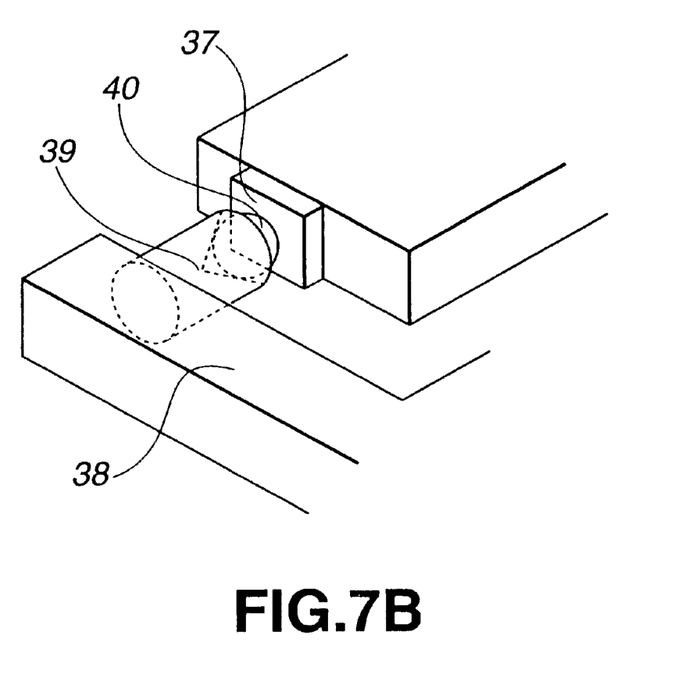

The plane bearing 37 may be formed circular or quadrangular as shown in FIG. 7A or 7B.

Figure 8:
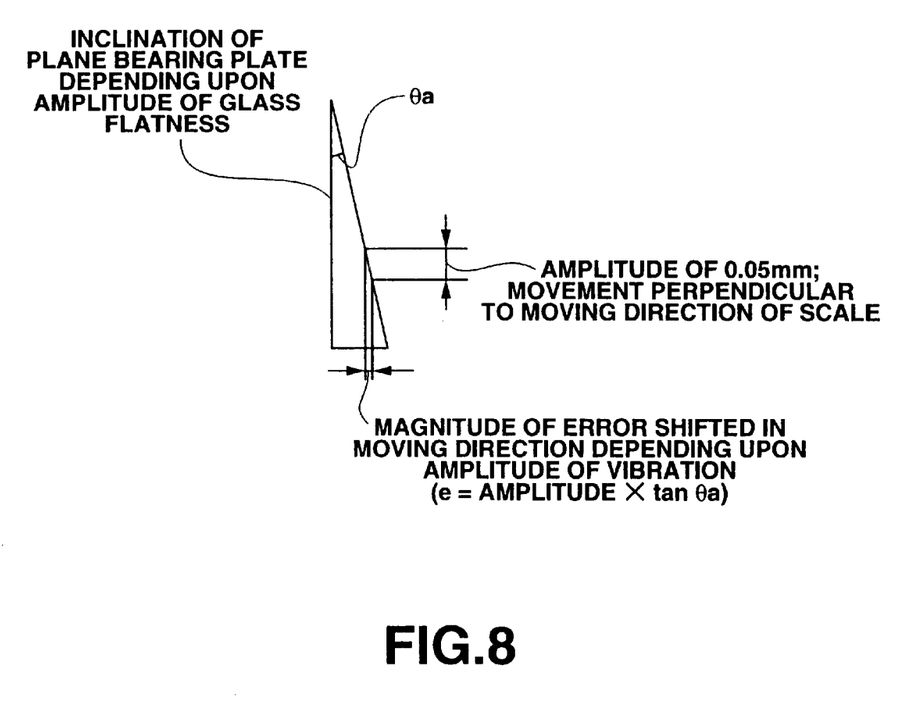
FIG. 8 schematically illustrates an error taking place when the plane bearing fixed to the carriage is not perpendicular to the moving direction.
Figure 9:
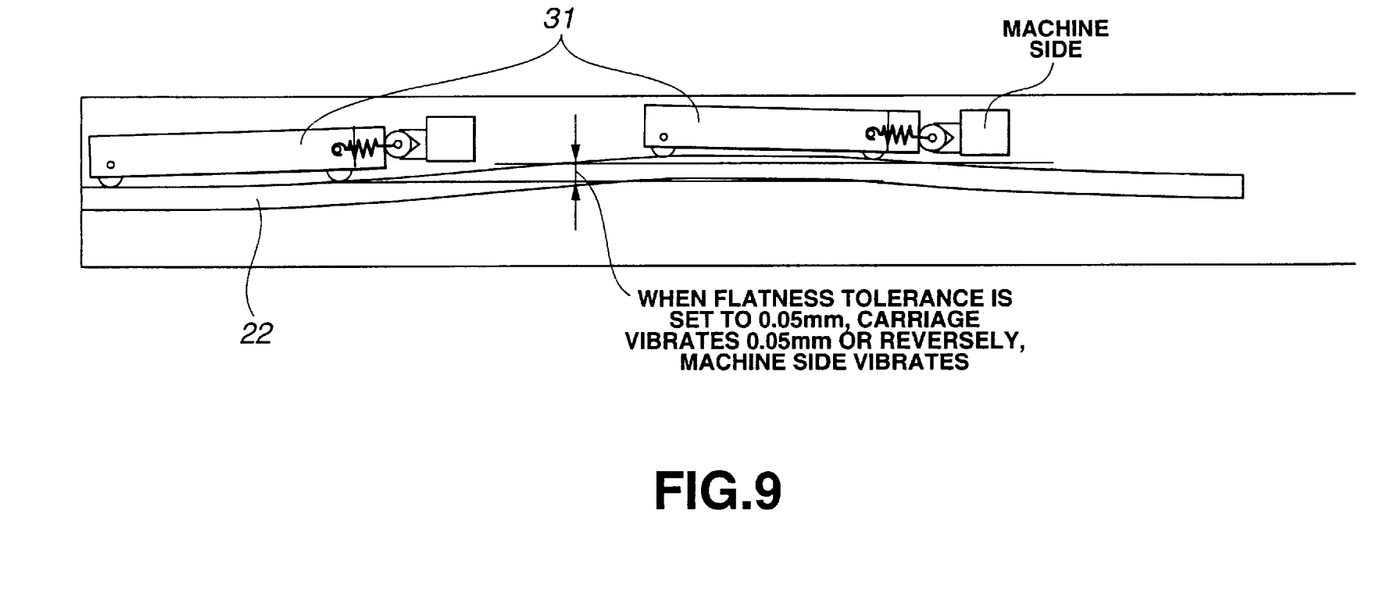
FIG. 9 explains the maximum value of the error taking place in the position transducer in FIG. 1.

Note that on the assumption that an angle when the plane bearing 37 fixed to the carriage 32 is not perpendicular to the moving direction is θa, an error e of amplitude by tan (θa) takes place as shown in FIG. 8. When a flatness of the scale surface of about 0.05 mm is allowed as an accuracy of adhesion of the scale surface to the housing 21 as shown in FIG. 9, a maximum amplitude at which the error e takes place is 0.05 mm as measured using an auto-collimator for the installed perpendicularity of the plane bearing 37 to be within a tolerance of 0.0833 deg. Therefore, an error of 0.05×tan (θa=0.0833 deg.), namely, about 0.000072 mm, at maximum will take place, which is a limit allowable with a scale which measures with a resolution of 0.0001 mm.

In the position transducer 10, since the carriage 32 and slider 33 are coupled to each other with the tension coil springs 41A and 41B having an elasticity with which the carriage 32 and slider 33 are attracted towards each other while the carriage 32 and slider 33 are butted to each other while the rolling bearing formed by the ball 40 is placed between the carriage 32 and slider 33, when the slider 33 and carriage 32 move relatively to each other, an Abbe error due to a positional change occurring between the coupling pieces can be eliminated, thus a measurement can be done with a reduced measurement error and a high accuracy.

Figure 10:
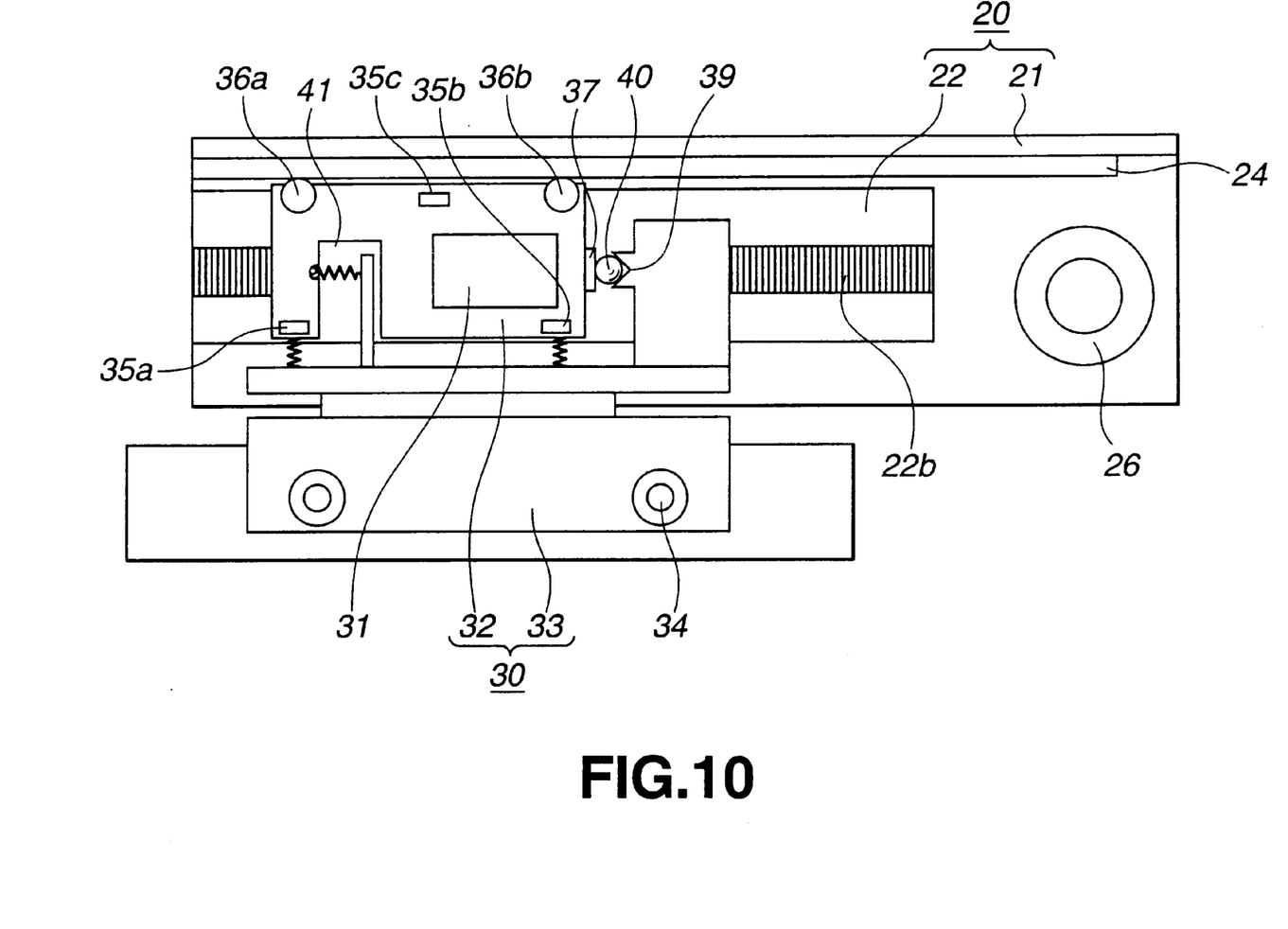
FIG. 10 is a front view of the essential portion of a variant of the position transducer in which the slider unit has another structure, with the housing being partially cut away.

In the position transducer 10, to provide an elasticity for maintaining the retention of the ball 40 between the plane bearing 37 and conical bearing 39, the two tension coil springs 41A and 41B are provided in the positions symmetrical with respect to the straight line passing through the vertex 39a of the bearing conical surface 39A of the conical bearing 39 and parallel to the moving direction of the carriage 32. As shown in FIG. 10, however, the structure of the slider unit 30 may be modified such that a single tension coil spring 41 is disposed on a straight line passing through the vertex 39a of the bearing conical surface 39A of the conical bearing 39 and parallel to the moving direction of the carriage 32, thereby providing an elasticity with which the ball 40 is kept retained between the plane bearing 37 and conical bearing 39.

Figure 11:
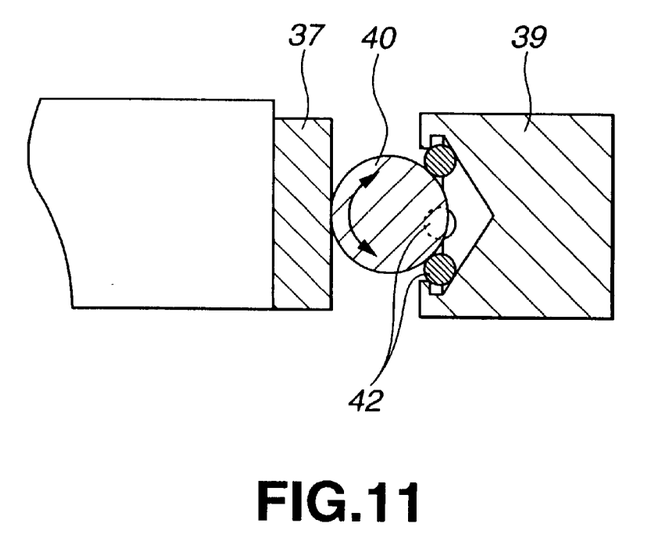
FIG. 11 is a sectional view of the essential portion of the position transducer in which the conical bearing is of a pivot bearing structure.
Figure 12:
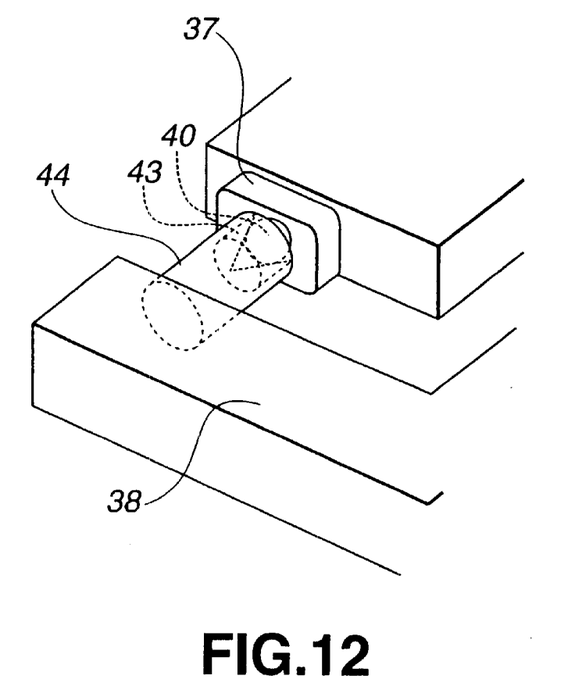
FIG. 12 is a perspective view of the essential portion of the position transducer, showing a structure for supporting the ball with a pair of plane bearings.

Also, to retain the ball 40 between the plane bearing 37 and conical bearing 39, a pivot bearing structure formed from a plurality of small-diameter balls 42 may be disposed on the bearing conical surface 39A of the conical bearing 39 as shown in FIG. 11. Moreover, the conical bearing 39 may be replaced with a plane bearing 44 having a cylinder 43 as shown in FIGS. 5D and 12 and thus the ball may be supported between the pair of plane bearings 37 and 44 having a bearing plane perpendicular to the moving direction of the carriage 32.

What is claimed is:

1. A position transducer comprising:

a long scale having a position detecting graduation provided thereon along a length thereof;

a carriage moving along the scale and having a detection head that reads the graduation to provide a position detection signal; and a slider coupled to the carriage and moving the carriage along the length of the scale, wherein the carriage and slider are coupled to each other by an elastic member having an elasticity in a direction the carriage and slider are attracted towards each other, with the carriage and slider being butted to each other with a freely rotatable ball placed at one end of the carriage in the moving direction and between them.

2. The position transducer as set forth in claim 1, wherein the ball is supported by a plane bearing having a bearing plane perpendicular to the moving direction of the carriage and a conical bearing having a bearing conical surface which has a vertex in the moving direction of the carriage.

3. The position transducer as set forth in claim 1, wherein the ball is supported by a pair of plane bearings each having a bearing plane perpendicular to the moving direction of the carriage.

4. The position transducer as set forth in claim 1, wherein the ball is supported by a plane bearing having a bearing plane perpendicular to the moving direction of the carriage and a pivot bearing having a plurality of small-diameter balls.

* * * * *